US010649079B1

(12) United States Patent
LaPrade

(10) Patent No.: US 10,649,079 B1
(45) Date of Patent: May 12, 2020

(54) GROUND-DIRECTED RADAR SYSTEM

(71) Applicant: Altec Industries, Inc., Birmingham, AL (US)

(72) Inventor: Charles J. LaPrade, Rocky Mount, VA (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/674,562

(22) Filed: Nov. 5, 2019

(51) Int. Cl.
*G01S 13/88* (2006.01)
*G01S 7/00* (2006.01)
*G01S 7/04* (2006.01)

(52) U.S. Cl.
CPC ............ *G01S 13/885* (2013.01); *G01S 7/003* (2013.01); *G01S 7/04* (2013.01)

(58) Field of Classification Search
CPC ...... G01S 13/885; G01S 19/14; G01S 13/347; G01S 13/86; G01S 7/003; G01S 7/04; G01S 13/931; G01S 7/022
USPC .......................................................... 342/22
See application file for complete search history.

(56) References Cited

U.S. PATENT DOCUMENTS

| 5,607,205 A * | 3/1997 | Burdick | E01C 19/00 299/1.5 |
| 6,445,334 B1 * | 9/2002 | Bradley | G01S 7/20 342/195 |
| 8,849,523 B1 * | 9/2014 | Chan | G01S 13/89 701/50 |
| 10,222,465 B2 * | 3/2019 | Feigin | G01S 13/885 |
| 2003/0020647 A1 * | 1/2003 | Yankielun | G01S 7/412 342/22 |
| 2003/0090406 A1 * | 5/2003 | Longstaff | G01S 13/0209 342/22 |
| 2009/0040093 A1 * | 2/2009 | Holly | G01S 13/04 342/22 |
| 2015/0268218 A1 * | 9/2015 | Troxler | G01S 13/0209 342/21 |
| 2019/0220008 A1 * | 7/2019 | Mizuno | B60W 40/06 |
| 2019/0315319 A1 * | 10/2019 | Williams | B60S 9/04 |

FOREIGN PATENT DOCUMENTS

KR          100576793 B1      8/2006

* cited by examiner

*Primary Examiner* — Olumide Ajibade Akonai

(74) *Attorney, Agent, or Firm* — Erise IP, P.A.

(57) ABSTRACT

A ground-penetrating radar system and method of operation are described. Particularly, embodiments describe configurations and operations of industrial truck safety systems that inform users of potentially hazardous conditions underground. Embodiments may detect a likely hazardous condition and perform additional examination in response to manual user and/or automatic computer input. Further embodiments may inhibit particular subsystems until the hazardous condition has been resolved and/or determined to be false.

19 Claims, 9 Drawing Sheets

GROUND-DIRECTED RADAR SYSTEM

BACKGROUND

1. Field

Embodiments of the invention are broadly directed to systems and methods of exploring and analyzing structures and compositions beneath an underlying supporting surface using downwardly-directed radar. Specifically, embodiments of the invention employ ground-penetrating radar from one or more pedals attached to an industrial truck to increase safety prior to and during operation of subsystems of the truck such as a boom, drill, or outrigger.

2. Related Art

Industrial vehicles are typically large, heavy, and/or expensive systems that must be deployed only on stable ground to protect against the risk of damage, injury, and potentially even loss of life due to destabilization of the truck and/or collapse of the underlying supporting layer. Such catastrophes can be caused by deploying the vehicle or its supporting outrigger on undetected subterranean structures, objects, compositions, and/or voids. Common causes of accidents include caves, loose gravel layers, tanks, storm drains, buried electrical or communication lines, or natural or man-made underground tunnels lying beneath seemingly-stable ground, concrete, or asphalt. Further, even in cases where no damage to the industrial truck, operators, or bystanders occurs, undesirable damage to these subterranean artifacts may be inconvenient and expensive.

The typical approach to detecting underlying threats, if performed at all, involve marking the area in which the truck is to be deployed and waiting for a third-party service to investigate the area. This approach wastes considerable time and money, and is often skipped for these reasons, leading to increased risk of disaster. What is needed is a system to be integrated or attached to industrial trucks that enables the user to analyze the composition and structure of the layer underlying the truck and/or its outrigger to ensure that the truck is being operated in a safe, stable location and orientation.

SUMMARY

Embodiments of the invention address this need by transmitting and receiving radar signals from one or more ground-directed pedals to determine the structure of a layer underlying an industrial truck. Embodiments may include a plurality of positions at which the radar signal-generating pedals may be permanently or removably attached to the industrial truck and/or a secondary mobile structure. Embodiments of the invention include various subsystems for powering, generating, transmitting, and receiving the radar signal, as well as hardware and software for analyzing the results and providing output to a user.

In a first embodiment, a ground-directed radar system comprises a vehicle having a cab and at least one outrigger. A monitor and control unit are located in the cab for user control and communication with at least one radar pedal coupled to the outrigger. The radar pedal is operable to transmit radar into an underlying layer and receive a reflected signal to generate output to be displayed on the monitor. Based on the output, an adjustment signal is transmitted back to the radar pedal to modify the operation of the pedal.

In a second embodiment, an industrial truck safety system comprises a control unit and at least one radar pedal removably attachable to any of a plurality of attachment positions on the industrial truck. The control unit communicates wirelessly with the radar pedal to control the operation of the pedal and to receive from the pedal signals corresponding to the physical structure of an underlying layer supporting at least a portion of the weight of the industrial truck. Additional attachment positions may be located on a wheeled structure that is separate from the industrial truck.

In a third embodiment, a method of operating a ground-directed radar system comprises the steps of transmitting an initiation command to a radar pedal causing it to emit a first signal into an underlying layer and receive a reflection of the first signal. Data from the reflected signal corresponding to the structure or composition of a first penetration depth of the underlying layer is then analyzed to determine a potentially hazardous condition. Thereafter, an alert of the potentially hazardous condition may be issued and/or a vehicle subsystem may be locked out. Additionally, an adjustment command may then be transmitted to the radar pedal to perform a second, modified scan of the underlying layer. For instance, the second scan may investigate the underlying layer to a greater penetration depth than the first scan. In response to data from the second scan, the alert and/or lockout may be terminated.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
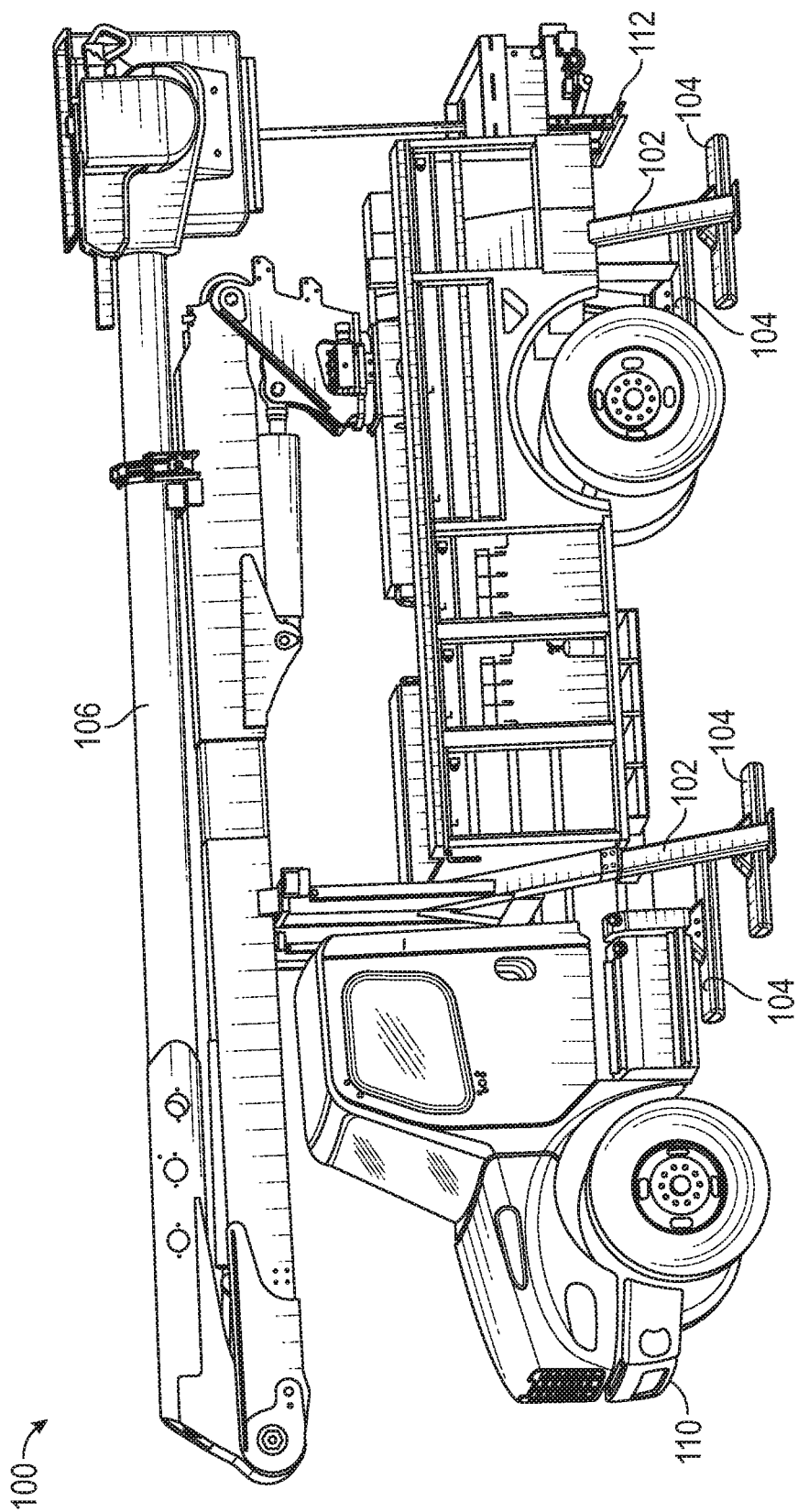
FIG. 1 depicts an exemplary industrial vehicle platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention are directed to systems and methods for investigating the structure and composition of a layer underlying and potentially supporting the weight of a vehicle such as an industrial truck. Industrial trucks include but are not limited to cranes, boom trucks, bucket trucks, chippers, derrick diggers, and other utility trucks with systems and components facilitating heavy-duty industrial applications beyond what is typically found on everyday commercial automobiles. This is not intended as limiting— embodiments of the invention may be provided on, removably coupled to, or provided separate from, any type of appropriate vehicle including everyday commercial automobiles, autonomous and semi-autonomous vehicles, and/or a wheeled apparatus propelled by hand or otherwise. Embodiments include radar generating and receiving pedals that may be removably or permanently coupled to an industrial truck at a plurality of attachment positions. Embodiments of the invention may further determine a potentially hazardous condition upon a first scan and perform further scanning to validate or invalidate the determination of the hazardous condition. These examples are not intended as limiting. Any embodiments providing the structures and/or employing the methods described for a ground-penetrating radar system and associated structures are intended for inclusion in embodiments of the invention.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Turning first to FIG. 1, an exemplary utility vehicle that may serve as a platform for ground-directed radar providing one element of certain embodiments of the invention is depicted. In some embodiments, certain components may be arranged differently or may be absent. Additional components may also be present. The utility vehicle 100 illustrated includes a boom 106, cab 108, and stabilizing outriggers with legs 102 and feet 104. This is not intended as limiting— embodiments may be permanently or removably attached to any type of vehicle. In some embodiments, one or more feet 104 may comprise or be comprised of a ground-penetrating radar pedal.

When a utility vehicle such as the one illustrated in FIG. 1 is preparing for deployment of boom 106 at a field location, such as a construction project site or roadside utility maintenance location, outriggers 102 may be extended via user controls to increase stability. The outriggers 102 function to direct a portion of the weight of the vehicle, as well as the weight of any cargo and occupants, away from the center of the vehicle, towards the surrounding underlying layer. In this description, "underlying layer" is intended to denote whatever is directly beneath the utility vehicle and/or a ground-directed radar pedal 300. Typically, the underlying layer is simply the ground, perhaps with a road material at the surface, but in some situations the underlying layer is more complex.

Figure 2A:
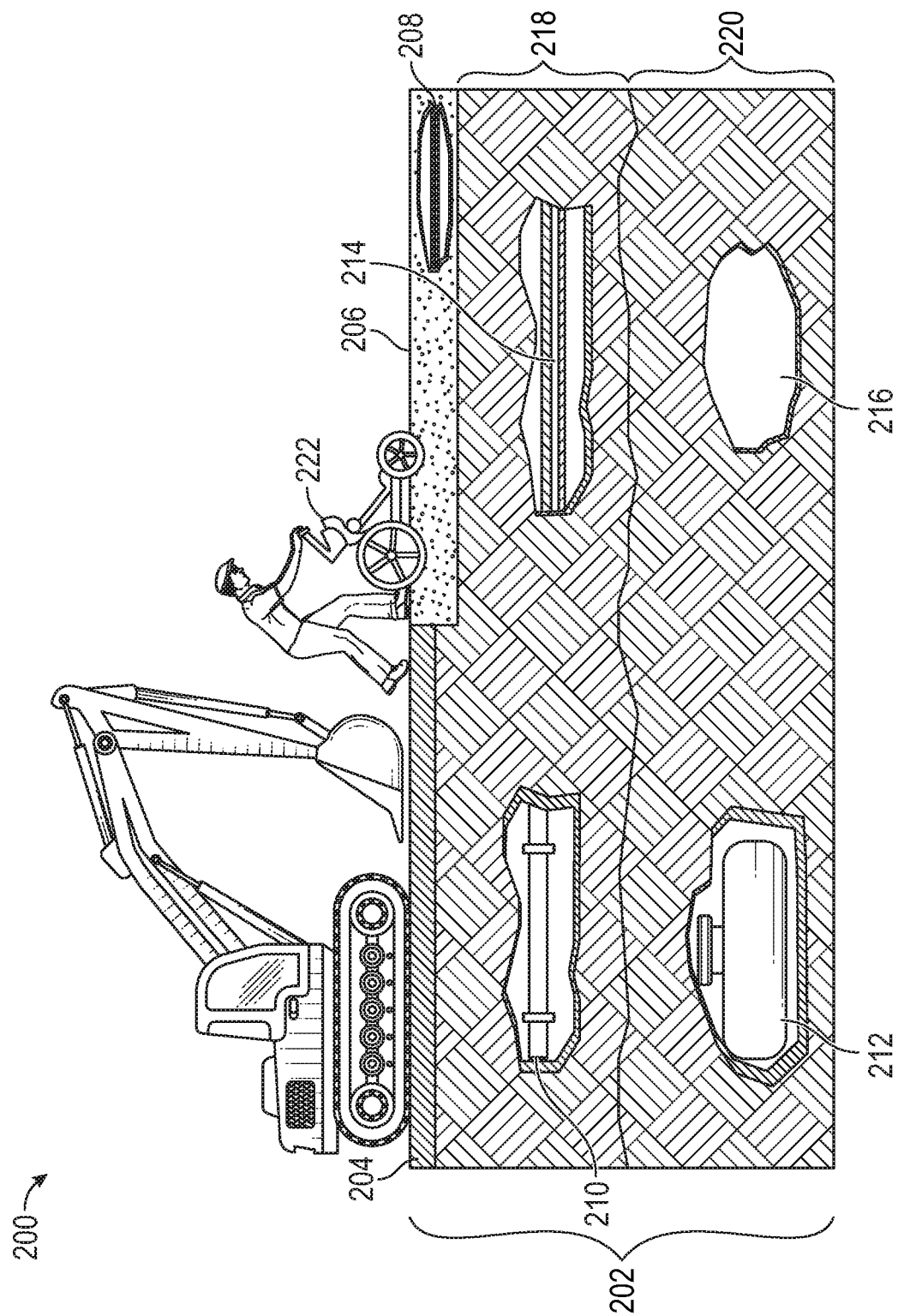
FIG. 2A depicts a first diagram of radar being utilized in embodiments of the invention to detect and analyze subterranean structures, objects, compositions, and voids.

As illustrated in FIG. 2A, the underlying layer 202 may be covered in a road surface 204 such as asphalt or concrete. In some situations, however, the underlying layer may simply be a loose earthen material 206 such as naturally-occurring or human-placed earthen materials such as soil, sand, or gravel. Beneath these illustrated layers 204,206 lies an upper layer 218 and a lower layer 220. In some situations, the upper and lower layers may be formed of different types of rock, materials of varying densities or compositions, or layers formed at varying times, pressures, or rates. The manner in which the upper layer may differ from the lower layer is not intended as limiting. Rather, the upper layer 218 and lower layer 220 are distinguished only in that they differ in some physical property that affects the layers' efficacy at supporting forces due to the weight of the industrial vehicle.

Further illustrated in FIG. 2A are a number of subterranean objects, artifacts, obstructions, and features that may be relevant to deciding whether or not to park utility truck 100 and/or deploy outrigger(s) 102 in a particular location. These include objects such as power line 208, pipe 210, tank 212, communications line 214, and/or structures such as void 216. Deployment of the industrial truck and/or outrigger(s) above an underlying layer containing any of these objects or structures could result in undesirable damage to the industrial truck, damage to the object or structure, and danger to users and their surroundings. The illustrated examples are not intended as limiting. Any subterranean object or structure that impacts the underlying layer's ability to support the weight of the industrial vehicle is relevant to the descriptions herein.

Figure 2B:
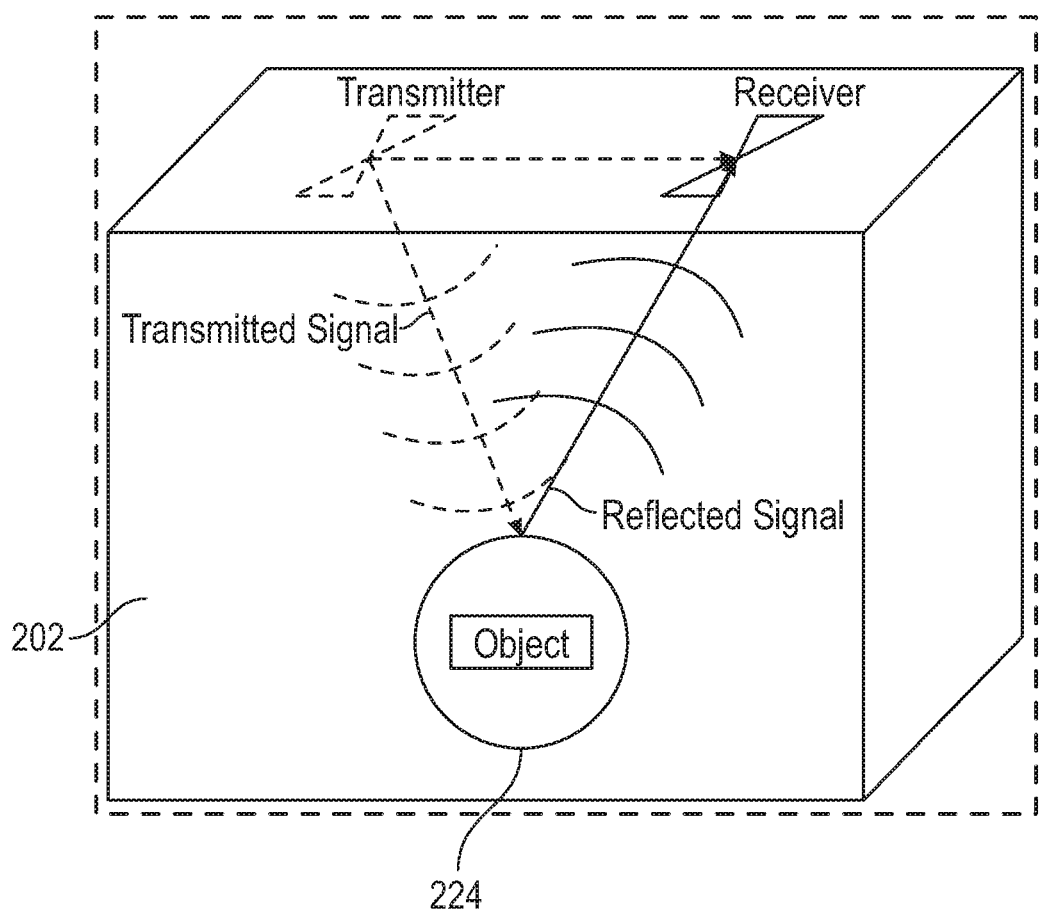
FIG. 2B depicts a second diagram of radar being utilized in embodiments of the invention to detect and analyze a subterranean object.

In embodiments of the invention, radar generated from one or more pedals 300 is directed into the underlying layer 202 to analyze the underlying layer's composition and structure, as well as detect any objects such as power line 208, pipe 210, tank 212, communications line 214 that may prohibit deployment of a truck and/or outrigger in that location. To do so, a signal from a transmitter within a radar pedal 300 is emitted into an underlying layer 202, as illustrated in FIG. 2B. A reflected signal is received at a receiver in the same or a different radar pedal 300 due to the interaction of the transmitted signal with a subterranean object 224, such as a septic tank. The example illustrated in FIG. 2B is not intended as limiting. For instance, the transmitter and receiver may be collocated and/or may share at least a portion of their required hardware.

Figure 3A:
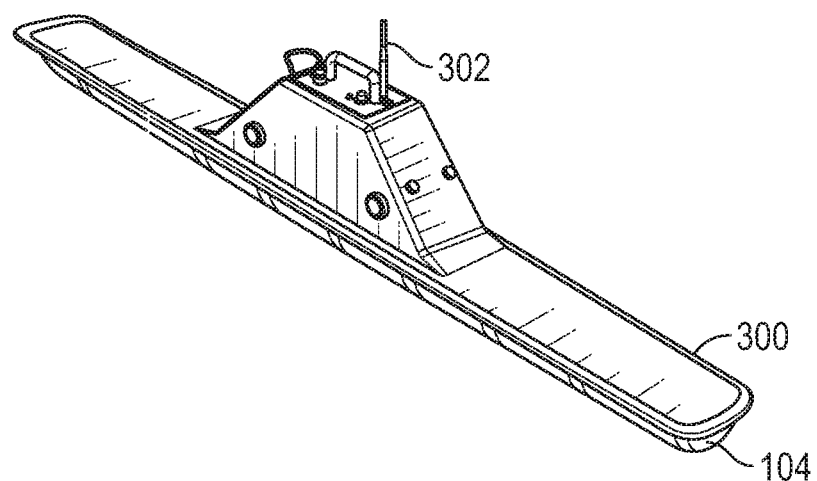
FIG. 3A depicts a number of exemplary radar pedals that may be utilized in embodiments of the invention.

FIG. 3A provides an illustration of a pedal 300 that may generate a ground-directed radar signal, in embodiments. In some embodiments, the pedal 300 illustrated may be contained within or may serve as foot 104 attached to an outrigger leg 102. In embodiments, pedal 300 includes an antenna 302 facilitating wireless connection via a control unit 304, discussed below. Antenna 304 may be an internal component of pedal 300 or may be omitted entirely in wired embodiments. Pedal 300 includes internal components that generate and emit a signal such as a radio-band radar signal into an underlying layer and internal components that receive a reflected radar signal from the underlying layer. This reflected signal can then be processed to determine the structure, dimensions, and/or composition of the underlying layer. Such processing may occur before and/or after transmitting data corresponding to the reflected signal to a control unit 304, described below with reference to FIG. 3B. Specifically, the transmitted data may comprise the entire received reflected signal, a selected portion of the received reflected signal, an analysis of the received reflected signal, or any combination thereof. In some embodiments, one or more radar pedals 300, described below with reference to FIG. 3A, may comprise one or more processors and memory to facilitate transmission, reception, storage, and analysis of radar signals, as well as communication with control unit 104 via a wired or wireless connection.

Figure 3B:
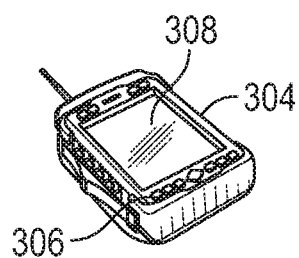
FIG. 3B depicts an exemplary control unit for user and/or automatic control of radar pedals that may be utilized in embodiments of the invention.

The pedal 300 is controlled and monitored via a control unit 304, such as in the embodiment illustrated in FIG. 3B, comprising input controls 306, a visual display 308, and a processor (not illustrated). The input controls 306 may comprise switches, buttons, knobs, dials, or any other physical input that may be used to adjust the functionality of the radar system or monitor its status via screen 308. Screen 308 may be provided as any kind of input and/or output screen appropriate for monitoring and/or controlling the radar system, such as a touch-sensitive LED screen. Specifically, screen 308 may be embodied as a monitor inside cab 108 or may be attached to the exterior of a vehicle. In other embodiments, screen 308 may be provided purely for output or may be omitted altogether. In some embodiments, control unit 304 may accept biometric input such as a fingerprint through screen 308 or a dedicated biometric input element not illustrated. In embodiments, control unit 304 may further comprise hardware that provides an audible and/or visible alarm in response to detection of a hazardous and/or likely hazardous condition, as will be further discussed below with regards to FIGS. 7 and 8. The alarm output may comprise or be provided in addition to screen 308. For example, the control unit 304 may include a speaker for emitting an attention-grabbing tone when a void or other unsafe structure in the underlying layer is detected by a radar scan.

In embodiments, the control unit 304 is operable to adjust the operation of one or more radar pedals 300, such as by selecting a mode of operation, initiating a scan, and/or selecting a frequency for an emitted radar signal. Such control of the radar pedal(s) may be performed manually and/or automatically by the processor of the control unit 304, in embodiments.

Control unit 304 may further comprise a wireless communication circuit such as an RF transmitter-receiver for enabling wireless communication with a remote location. This is not intended as limiting—structures for providing any manner of wireless communication are intended for inclusion in embodiments of the invention including those utilizing cellular phone networks, public-switched telephone networks, and satellite communications. In some embodiments, the control unit may be built-in to other subsystems of the industrial truck, perhaps located in cab 108. In additional embodiments, the control unit may be provided at a fixed location on the exterior of the industrial truck 100, such as at the rear of the truck 112. In embodiments, the control unit 304 may not be contained in a single housing, but rather may have a computing portion and a separate monitor. In some embodiments, control unit 304 may be provided with a clip, strap, or snap to enable a user to carry it on their person.

In other embodiments, control unit 304 may be located at a remote location, such as a headquarters or remote controlling station, and may control and monitor the radar system from long-range via network connection, such as the cellular telephone or the Internet. In some embodiments, each pedal 300 may have its own power source, distinct from the power source of other subsystems of the industrial truck 100 such as control unit 304 to protect against and reduce the impact of an electrical fault. Such a configuration may be desirable particularly for industrial trucks and implementations when the likelihood of intentional or accidental contact with power lines is high. In other embodiments, a plurality of pedals may share a power source which is distinct from the power source serving one or more other subsystems of the industrial truck 100. These are not intended as limiting. In embodiments, all subsystems of industrial truck 100 may be powered by a single power source. In embodiments, one or more radar pedals 300 may be electrically insulated from a portion of the industrial truck 100 that includes the boom 106, which may reduce the risk of damaging the electronics of the radar pedal(s) 300 in the event the boom 106 makes contact with a power line.

In some embodiments, some or all of control unit 304 may be provided in a hand-held body, physically separate from the other subsystems of the industrial truck 100 but communicatively coupled via wired and/or wireless connection. Any protocol of wireless connection may be employed in embodiments of the invention. Also included in systems supporting embodiments of the invention is a local storage module, which may be any form of computer-readable media and may be internally installed in control unit 304 and/or externally and removeably attached. Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. Examples of stored information include computeruseable instructions, data structures, program modules, and other data representations. The ground-directed radar system may include ports for inputting and outputting digital information, including but not limited to one or more Universal Serial Bus (USB) ports. The radar system may additionally include a geographic location sensing element such as a Global Positioning System (GPS) module that may be located in one or more pedals 104 and/or cab 108. Control unit 304 may provide displays and/or input controls for monitoring and adjusting operation of the radar pedals 104, which will further be discussed below.

Figure 4:
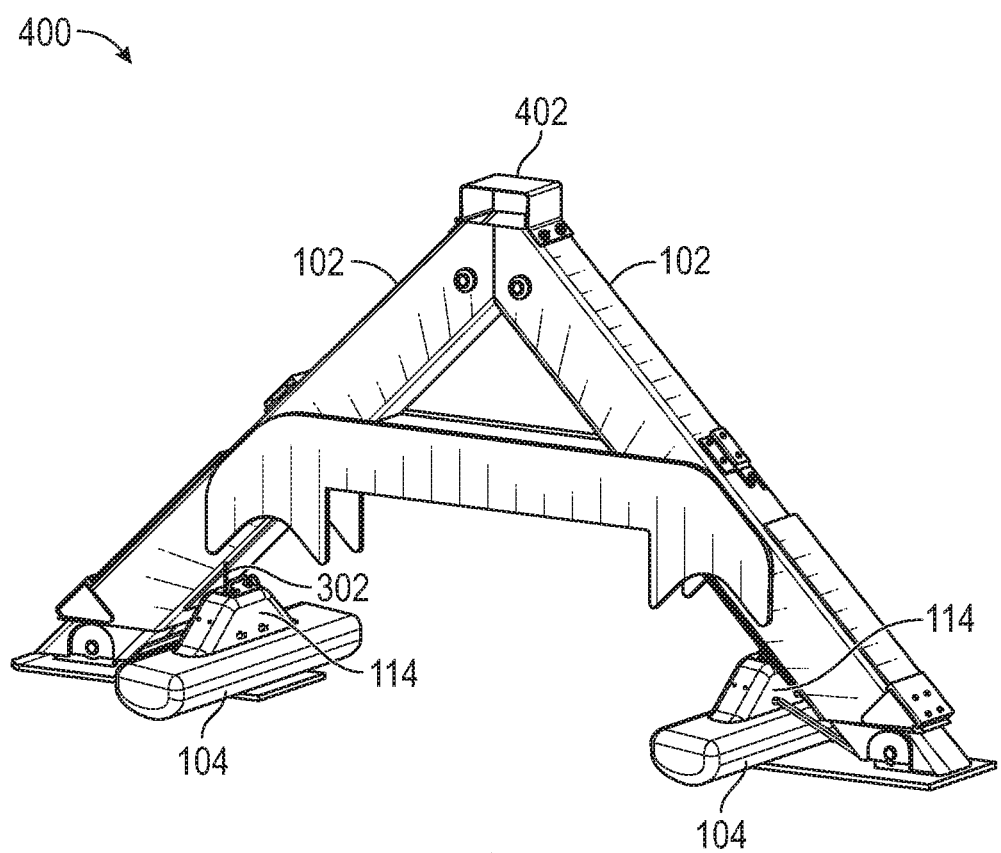
FIG. 4 depicts a first exemplary configuration of radar pedals coupled to attachment positions on an outrigger of an industrial vehicle.

Illustrated in FIG. 4 is a close-up view of two feet 104 serving as radar pedals attached to legs 102 of an outrigger 400 at attachment positions 114, which may couple to an industrial truck 100 at via a bracket 402. This illustration is not intended as limiting—for instance, attachment positions 114 may be on the outside or underneath of outrigger 104. In some embodiments, an industrial truck 100 may include a plurality of attachment positions at almost any point on the exterior of the vehicle in which the pedal 300 may be appropriately directed towards the underlying layer when attached at that attachment position 114. In some embodiments, attachment positions 114 may be located such that any pedal 300 attached at a particular attachment position makes direct physical contact with the surface of the underlying layer. Attachment positions 114 may particularly be at the nose 110, at the rear 112, or directly underneath the industrial truck 100.

In some embodiments, one or more pedals may be permanently attached at one or more attachment positions 114. In other embodiments, the pedal(s) 300 may be removably attachable to one or more attachment positions 114, and may be reattached at any desired attachment position for a particular deployment. Embodiments are further envisioned in which some pedals are permanently attached while others are removably attached from attachment positions 114.

In embodiments, one or more pedals may be attached at an attachment position 114 at the nose 110 of the industrial truck to perform the ground radar analysis methods of this description while the vehicle is driving. Specifically, the system may include sensors to detect that a pedal 300 is attached at one or more attachment positions 114 at the nose of the industrial vehicle 100 and enable radar scanning while the vehicle is driving only if one or more pedals 300 is sensed at one or more of the attachment positions. When the radar pedal 300 is attached to the driving attachment position, the radar pedal 300 may transmit signals corresponding to the physical structure of an underlying layer while driving the industrial truck. This is not indented as limiting. The system may enable or disable ground radar scans based on sensing one or more pedals 300 at any attachment position 114 on the industrial vehicle 100.

Figure 5:
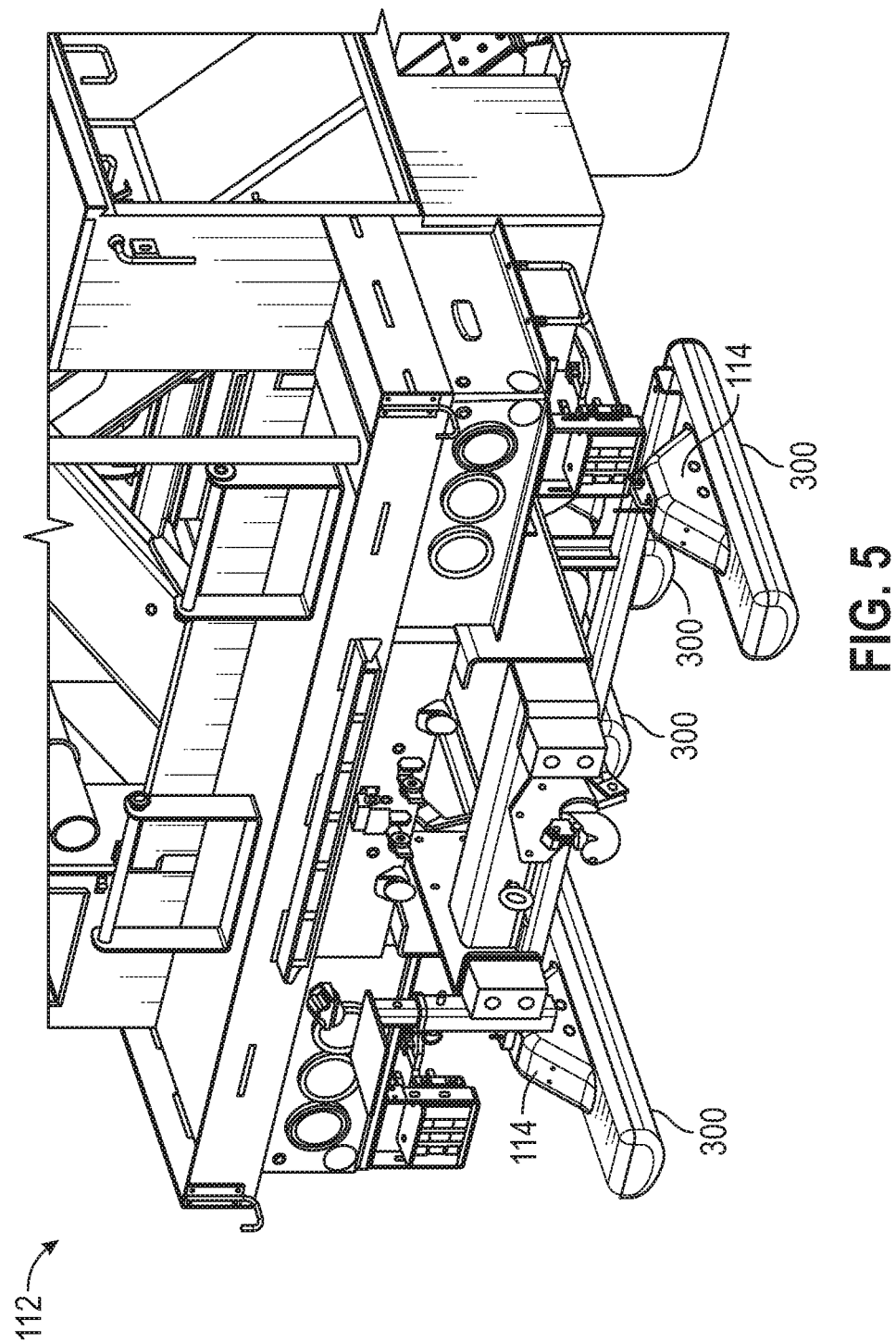
FIG. 5 depicts a second exemplary configuration of radar pedals coupled to attachment positions on an industrial vehicle.

An embodiment of a plurality of radar pedals 300 removably coupled to attachment positions 114 at the rear 112 of a utility truck 100 is illustrated in FIG. 5. In embodiments, one or more pedals may be removably coupled via bolts, screws, spring-loaded quick-release couplings, or magnets. These are merely exemplary and are not intended as limiting. Any other method of removably attaching the pedals to the attachment positions is intended for inclusion in embodiments of the invention.

Returning to FIG. 2A, an alternative attachment position may be proved on a wheeled structure 222 separate from the industrial truck 100 for scouting an underlying layer prior to driving over or deploying an outrigger on the spot being scouted. In embodiments, the wheeled structure 22 may be human propelled and/or be equipped with one or more electrical motors and/or combustion engines. The wheeled structure may additionally be permanently or removably coupled to a control unit 304. In embodiments, direction of the wheeled structure may be wholly or partially autonomous, or the wheeled structure may be completely manually guided. In embodiments, the wheeled structure may comprise a location sensing module. In such an embodiment, the system may detect and store a current geographic location upon a user's command and/or in response to data determined by an attached radar pedal 300. For example, a user operating a wheeled structure 304 with an attached radar pedal 300 may perform a radar scan searching for an object 224, such as a particular tank or a cave. Upon finding the location of the object of interest, the current geographic location may be automatically or manually (in response to an input to control unit 304 via an input control) detected and stored, perhaps alongside other metadata and/or a record of the received reflected signal. Such an embodiment would then enable the user or other users to position the industrial truck 100 appropriately to excavate or avoid the object of interest safely and efficiently. In embodiments, a wheeled structure 222 may be carried by and/or removably coupled to an industrial vehicle 100 for transportation to and from worksites.

Figure 6:
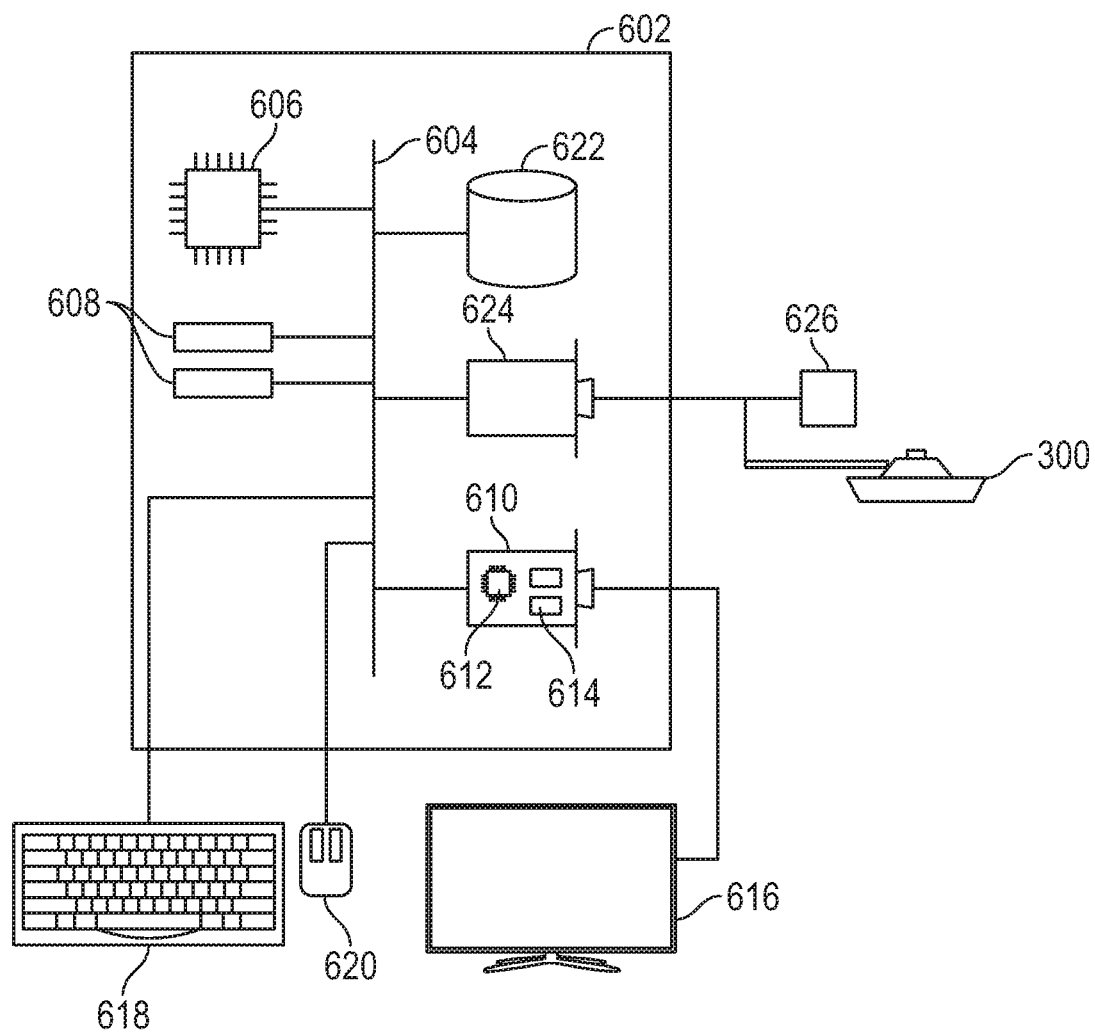
FIG. 6 depicts an exemplary hardware platform for certain embodiments of the invention.

Illustrated in FIG. 6 are hardware elements that may be present in the radar system of embodiments of the invention. Computer 602 serving as at least a portion of control unit 304 may be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 104 are one or more random-access memory (RAM) modules 608. Also attached to system bus 604 is graphics card 610. In some embodiments, graphics card 610 may not be a physically separate card, but rather may be integrated into the motherboard or the CPU 606.

In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is monitor display screen 616 for user interaction. In some embodiments, no display may present, while in others it is integrated into control unit 304. Similarly, peripherals such as keyboard 618 and/or a mouse or other input controls 620 are connected to system bus 604. Like monitor display 616, these peripherals may be integrated into control unit 304 or absent. Also connected to system bus 604 is local storage 622, which may be any form of computer-readable media, and may be internally installed in computer 602 or externally and removably attached.

Network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 102 to local network 626, which may also include one or more other computers, data stores, and/or one or more radar pedals 300. Generally, a data store may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer, accessible on a local network such as local network 626, or remotely accessible over the Internet. Local network 626 is in turn connected to the Internet, which connects many networks such as local network 626, remote network 634 or directly attached computers. In some embodiments, steps of methods disclosed may be performed by a single processor 606, single computer 168, single memory 608, and single data store, or may be performed by multiple processors, computers, memories, and data stores working in tandem.

Operation of Embodiments of the Invention

Figure 7:
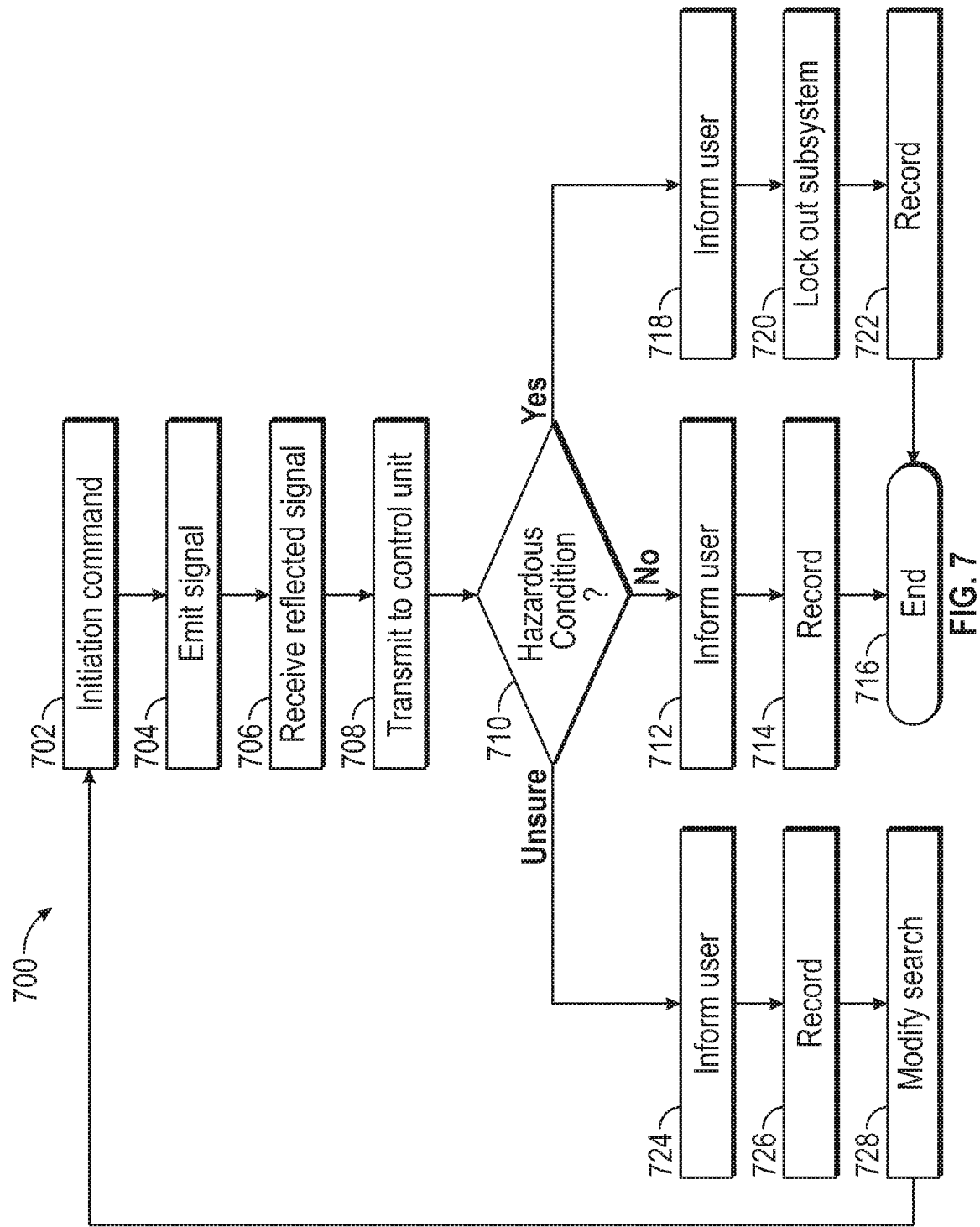
FIG. 7 depicts a first flowchart illustrating the operation of a method in accordance with an embodiment of the invention.

Illustrated in FIG. 7 is a method that may be stored in computer-executable instructions on a non-transitory computer readable medium of the system according to an embodiment of the invention beginning at step 702, in which an initiation command is transmitted from the control unit 304 via wired or wireless connection to at least one radar pedal 300. In some embodiments, this may be in response to a user's manual input to the control unit 304 or a remote command, while in other embodiments this may occur automatically based on a sensed parameter such as a geographic location, the industrial truck (or other vehicle) being put in park, deployment of an outrigger, or engagement of some other vehicle subsystem such as boom 106. In the embodiment illustrated in FIG. 7, the initiation command causes a radar pedal 300 to emit a signal into the underlying layer to determine its structure and/or composition. The signal is emitted in step 804 at a frequency that may be predetermined and stored in either of the control unit 304 or the pedal 300, in embodiments, or may be manually selected by a user of the control unit 304, in other embodiments. In a particular embodiment, a predetermined transmission signal frequency may be stored in the control unit 304 but may be overridden by a user's manual input and transmitted to the radar pedal as part of the initiation command in step 702.

As will be further discussed below, in some instances the initiation command may be a subsequent initiation command, initiating a second scan of the same location after an initial scan of the layer underlying that location has already been performed. In such situations, the frequency of the signal emitted in step 704 (of the subsequent scan) may be automatically determined by the processor of control unit 304 or pedal 300 based on information gathered during the initial scan.

In step 706, a reflected signal is received at one or more pedals 300. In some embodiments, a reflected signal is received at the same pedal 300 from which the transmitted signal that resulted in the reflected signal was previously transmitted, while in other embodiments, the transmitting pedal and receiving pedal may be distinct pedals. The received reflected signal will thereafter be processed to determine if there exists a likely hazardous condition in the underlying layer, such as an object, structure, or void previously discussed. Typically, this processing is performed at the control unit 304 after the one or more radar pedals 300 transmit the data collected from the reflected signal back to the control unit in step 708. In such embodiments, the transmission back to the control unit 304 in step 708 may comprise all or only a selection of the information collected from the reflected signal in step 706. Particularly, filtering to reduce noise and/or sampling may be performed by a processor of one or more pedal(s) 300 to reduce the amount of data, particularly irrelevant or noisy data, that is to be transmitted back to the control unit 304 in step 708.

In step 710, the processor of the control unit 304 and/or a user of the control unit perform a determination of the likelihood of a hazardous condition in the underlying layer based on information received from one or more pedals regarding the received reflected signal. In some embodiments, this may be performed completely by the user, based on a review of an image rendered on display screen monitor 308 and/or other alphanumeric data output such as measured depths or densities. In other embodiments, the hazardous condition determination of step 710 may be performed completely by the processor of the control unit 304 based on an internal analysis of the data transmitted by the radar pedal(s) 300. In still further embodiments, a hybrid decision may be made at step 710 by the processor and user of control unit 304. For example, the processor may determine a likely hazardous condition and output data to the user for agreement or dissent. As another example, the processor may determine the composition of the underlying layer and output the results graphically and/or alphanumerically to a user of control unit 304, but leave the determination of the hazard level of the determined composition and structure up to the user. These examples are not intended as limiting. Any appropriate hazard condition determination may be performed in step 710.

In some embodiments, the hazardous condition determination of step 710 may take into account the type of work that is intending to be performed at that location. For instance, a particular structure of an underlying layer may be acceptable for parking on, but not for deployment of an outrigger or for drilling. In another example, a detected void may be determined to be not hazardous (a "No" determination at step 710) if the intended action to be taken is excavation, but may be an "Unsure" if the user intends to park the industrial vehicle 100, and a "Yes" if an outrigger leg 102 is to be deployed above the void and a boom 106 is to be operated. This may require a prior user input of the intended work to control unit 304 and/or a retrieval from a database for a project number, date, and/or location.

In some alternative embodiments, processing of the reflected signal to determine the likelihood of a hazardous condition may be performed by a processor in one or more of the pedals 300, prior to transmitting data to the control unit 304 in step 708. In such an embodiment, the data transmitted in step 708 to control unit 304 may comprise only a simple determination of the likelihood of a hazardous condition, and may or may not include a rendered image of the underlying layer. In some of these embodiments, the hazardous condition processing may be performed at one or more pedals, and the transmission of step 708 may only occur if a hazardous condition has been positively determined. In other embodiments in which the processing is determined at one or more pedals 300, the responsive transmission from the pedal(s) may be transmitted if a hazardous condition cannot be ruled out (a "Yes" or "Unsure" determination in step 710). In still other embodiments in which the processing is determined at one or more pedal(s) 300, the responsive transmission from the pedal(s) may be transmitted regardless of the outcome of the determination. Other appropriate processes for making a hazardous determination at step 710 described above in embodiments at which the hazardous condition determination is performed at the control unit 304 may similarly be performed by the processor of one or more pedals 300, in embodiments.

Regardless of how the hazardous condition determination of step 710 is performed in a particular embodiment, if the answer is determined to be "No," then the method proceeds to step 712 in which the user is informed by display 308 and/or an audio output or other type of output that the underlying layer does not contain a hazard and work is to be allowed. In step 714, information may be recorded in memory regarding the scan, which may include any or all of the complete received reflected signal, a sampling and/or filtering of the received reflected signal, the final hazardous condition determination, the responsible party for the hazardous condition determination (the processor and/or user), the user's response to the hazardous condition determination (such as an acceptance or an override), the time of scanning, the time of the user's response, other collected data such as a user's notes, a project number, or a video recording of the worksite, the sensed geographic location, and the work or actions intended to be performed at the location. These examples are not intended as limiting on the data that may be stored at step 714. Thereafter, the scanning process may end at step 716 and work may proceed.

If, however, the hazardous condition determination of step 710 is performed and the answer is determined to be "Yes," then the method proceeds to step 718 in which the user is informed by display 308 and/or an audio output or other type of output that the underlying layer does contain a hazard and work is not to be allowed. In embodiments, this may include an audible alert and/or visible alert, a graphical display of the underlying layer, and/or any other appropriate output to alert the user of the determination.

At step 720, one or more subsystems of the industrial truck 100 may be locked out and/or deactivated in response to the hazardous condition determination at step 710. These subsystems may include, for example, boom 106, outrigger leg(s) 102, a drilling subsystem, a PTO (power take-off) subsystem, and/or a bucket. In some embodiments, a user may be able to override one or more of the lockouts via control unit 304, which may require a biometric and/or passcode authentication.

Thereafter, information may be recorded in memory in step 720 regarding the determination of the hazardous condition, which may include any or all of the complete received reflected signal, a sampling and/or filtering of the received reflected signal, the final hazardous condition determination, the responsible party for the hazardous condition determination (the processor and/or user), the user's response to the hazardous condition determination (such as an acceptance or an override), the time of scanning, the time of the user's response, other collected data such as a user's notes, a project number, or a video recording of the worksite, the sensed geographic location, and the work or actions intended to be performed at the location. These examples are not intended as limiting on the data that may be stored at step 720. Thereafter, the scanning process may end at step 716. In some embodiments, a lockout may persist for a predetermined period of time, until overridden by an authorized user, until a second scan is performed finding and/or until a new radar scan is performed that determines there does not exist a hazardous condition.

If, however, the hazardous condition determination of step 710 is performed and the answer is determined to be "Unsure," then the method proceeds to step 724 in which the user is informed by display 308 and/or an audio output or other type of output that the underlying layer may contain a hazard and work is not to be allowed. In embodiments, this may include a visual and/or audible alert and/or a graphical depiction on the screen 308 of the source of the potentially hazardous condition and/or an alphanumeric description of the source of the potentially hazardous condition. For example, a scan of an underlying layer may detect the beginning of a void very near the deepest limit of the penetration depth of the scan. The void could be an inch deep or could be the top of an entire cave system—without scanning deeper the system is incapable of determining whether or not a hazardous condition truly exists. In such a situation, embodiments of the invention may determine a possible hazardous condition in step 710, inform the user in step 724 as in steps 712 and 718 previously, record data corresponding to the determination as in steps 714 and 722 previously, and may take the additional step of locking out one or more subsystem as in step 720 previously to prevent further work until the system can determine that a hazardous condition is not present. This is merely one example and is not intended as limiting. An "Unsure" determination of a hazardous condition could arise from alternative situations, such as layers of underlying material that cannot be penetrated by the utilized frequency for the transmission signal, a weak or absent reflected signal, or a subterranean object that cannot be identified by the user and/or processor of control unit 304.

In embodiments, this the system may then modify the previous search in some way in step 728 to verify or disprove the presence of a hazardous condition. This may, for example, automatically or manually selecting a different frequency for the transmitted signal, increasing the power of the transmitted signal, increasing the sensitivity of the receiving hardware of one or more pedals 300, or relocating one or more pedals 300. Thereafter, the process may return to step 702.

Figure 8:
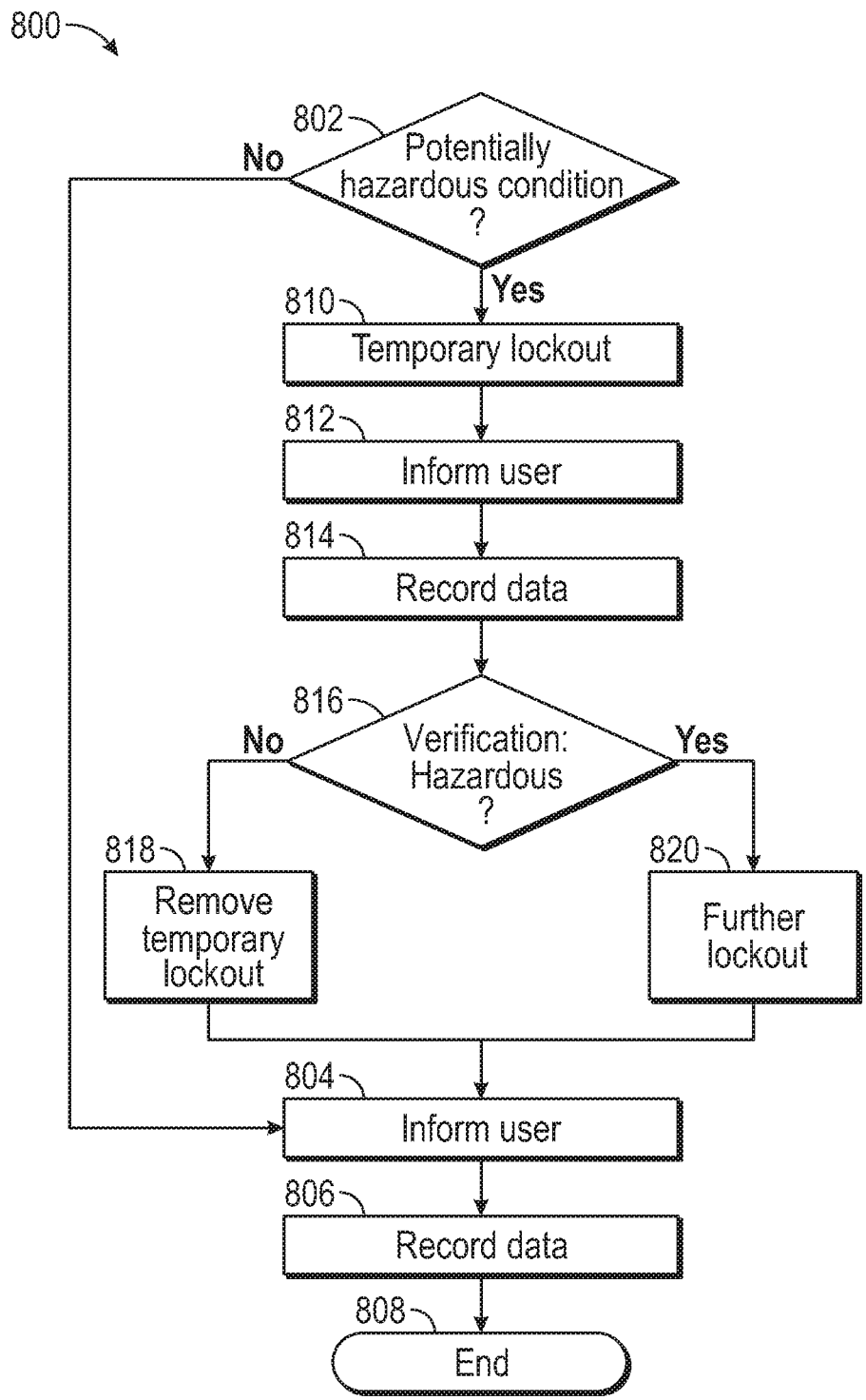
FIG. 8 depicts a second flowchart illustrating the operation of a method in accordance with an embodiment of the invention.

An embodiment providing further description of this type of process is illustrated in FIG. 8, in which a modified search is performed in response to a determination of a potentially hazardous condition. If a potentially hazardous condition is not determined in step 802, the system immediately informs the user in step 804, records data in step 806, and ends in step 808, as previously discussed for FIG. 7. However, if a potentially hazardous condition is determined in step 802, the method proceeds to step 810, in which a temporary lockout of a subsystem is activated by the processor of control unit 304 or another connected processor in the industrial truck's computing system. Particularly, the temporary lockout may prevent the user from using a vehicle subsystem such as an outrigger 102, boom 106, and/or PTO until a second scan is performed. In some embodiments, the temporary lockout may entail disabling the controls and/or powering down the particular subsystem, but these examples are not limiting.

In step 812, a user is informed of the potentially hazardous condition and/or the temporary lockout status of particular subsystems. In embodiments, this may occur before or simultaneously with the lockout initiation of step 810. Step 810 may include an attention-grabbing alert such as an illumination, flashing, or blinking of lights, an audible alert, and/or a haptic tactile alert such as a vibration. In step 814, info is stored in local and/or remote memory regarding the potentially hazardous condition, the initial scan that determined the potentially hazardous condition, and/or the user's response to the potentially hazardous condition. Recording of data may occur in any order with steps 810 and 812, and/or may be performed multiple times throughout the overall process.

At step 816 a second scan of the underlying layer is performed to for verification of the hazardous condition. In embodiments, the second scan is modified from the initial scan in some manner, such as by emission of radar signals at a higher or lower frequency, increasing the power of the scan, increasing the time of the scan, otherwise increasing the penetration depth of the underlying level, changing the position of one or more pedals 300, changing the orientation of one or more pedals 300, utilizing more or fewer pedals 300 than in the initial scan, emitting signals from a different pedal(s) than in the initial scan, receiving a reflected signal from a different pedal 300 than in the initial scan, filtering the received signal differently, sampling the received sampling differently, or processing data using different artificial intelligence steps, schemes, standards, or confidence level thresholds. Any or all of these or other modifications may differentiate the second scan from the initial scan, or other modifications may be employed. In embodiments, the second scan performed at step 816 may not differ from the initial scan but rather may merely be a second performance of the same scan.

Any modification(s) to the additional scan may be implemented automatically by processor 606 of the control unit 304 or manually in response to user input. Specifically, a first scan may only be capable of scanning to a first penetration depth due to the composition or structure of the underlying layer and the frequency and power of the emitted signal. In response to an "Unsure" determination of a hazardous condition (a "potentially hazardous" condition), a second scan may adjust the frequency and/or power of a second emitted signal in response to a user's manual input or automatically at the direction of processor 606 to scan to a second, deeper penetration depth.

At step 818, if the verification scan determines that the potentially hazardous condition is no longer present and/or was a false alarm the temporary lockout established in step 810 is removed and the user is informed, such as via display screen monitor 328 in step 804. Thereafter, appropriate data regarding the additional scan and results are stored in memory in step 806. Thereafter, the scanning process may end at step 808 and work may proceed. Removal of the temporary lockout in step 818 may require a user acknowledgement or authorization via control unit 304, in embodiments.

In some embodiments, the system may progress from the second scan (or subsequent "further" scan) to step 818 even if the result of a further scan in step 816 was still an ambiguous "Unsure" determination.

At step 820, if the verification scan determines that the potentially hazardous condition is still present and/or is positively verified, the system may further the temporary lockout established in step 810. Furthering the lockout may comprise extending the time length of the lockout, increasing the authority level required to override the lockout, increasing the number of users necessary to override the lockout, increasing the number of subsystems locked out, and/or increasing the alert or types of alerts provided to the user. These examples are not intended as limiting. In some embodiments, the temporary lockout of step 810 may remain unchanged in response to a second scan. Specifically, the system may issue a second alert in response to the verification of the potentially hazardous condition that may be the same as the first alert or differ in any of the manners discussed.

In some embodiments, the system may progress from the second scan (or subsequent "further" scan) to step 820 even if the result of a further scan in step 816 was still an ambiguous "Unsure" determination. In some embodiments, the temporary lockout of step 810 may be omitted and the lockout due to the verification of the hazardous condition in step 820 may be the only lockout activated.

In embodiments, a second scan may still result in an "Unsure" determination of a hazardous condition for the same or different reasons as in the initial scan. In embodiments, additional scanning, modified or unmodified, may be performed in response to the second "Unsure" determination at step 816, repeating the steps described above for a second scan and proceeding to steps 818 or 820 only when a "Yes" or "No" determination can be determined.

Embodiments of the invention may employ fuzzy logic at any appropriate step to determine the likelihood of a hazardous condition, using confidence levels with thresholds predetermined or dynamically determined (by processor 606 of control unit 304, a processor of one or more pedals 300, and/or the input of a user) to discriminate between hazardous conditions, non-hazardous conditions, and unsure or potentially hazardous conditions.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A ground-directed radar system comprising:
a vehicle comprising a cab and at least one outrigger;
a monitor located within the cab;
a control unit located within the cab; and
a radar pedal coupled to the outrigger,
wherein the radar pedal emits a signal at a first frequency into an underlying layer;
wherein a reflected signal is received by the radar pedal;
wherein a resultant output generated from the reflected signal is displayed on the monitor,
wherein the resultant output illustrates the structure of the underlying layer to a first depth, and
wherein the control unit transmits an adjustment signal causing the radar pedal to emit a signal at a second frequency into the underlying layer.

2. The system of claim 1,
wherein the radar pedal is disposed in a first portion of the system,
wherein the vehicle further includes a boom disposed within a second portion of the system, and wherein the first portion of the system is electrically insulated from the second portion of the system.

3. The system of claim 1, wherein the radar pedal is permanently coupled to the outrigger.

4. The system of claim 1,
wherein the control unit is powered by a first power source,
wherein the radar pedal is powered by a second power source,
wherein the first power source is distinct from the second power source.

5. The system of claim 1,
further including a memory unit,
wherein a record of the resultant output is stored in the memory unit.

6. The system of claim 5,
further including a location sensing module,
wherein the record of the resultant output stored in the memory unit includes a geographic location sensed by the location sensing module.

7. The system of claim 1, wherein the adjustment signal transmitted in response to user's input.

8. An industrial truck safety system comprising:
a radar pedal;
a control unit; and
a plurality of attachment positions on an industrial truck,
wherein the radar pedal is removably attachable to any of the attachment positions of the plurality of attachment positions;
wherein a first attachment position in the plurality of attachment positions is on a first outrigger of the industrial truck,
wherein the control unit communicates wirelessly with the radar pedal to control an operation of the radar pedal, and
wherein the radar pedal communicates wirelessly with the control unit to transmit signals corresponding to the physical structure of an underlying layer,
wherein the underlying layer at supports at least a portion of a weight of the industrial truck.

9. The system of claim 8, wherein the control unit is provided in a handheld device including a monitor.

10. The system of claim 8, further including a second radar pedal removably attached to a second attachment position in the plurality of attachment positions.

11. The system of claim 8, wherein the control unit is provided at a fixed location on the exterior of the industrial truck.

12. The system of claim 8,
further including a wheeled structure separate from the industrial truck,
wherein the wheeled structure includes an alternative attachment position,
wherein the radar pedal is removably attachable to the alternative attachment position.

13. The system of claim 8,
wherein a driving attachment position is located at the nose of the industrial truck,
wherein the radar pedal transmits signals corresponding to the physical structure of an underlying layer while driving the industrial truck when the radar pedal is attached to the driving attachment position.

14. A method of operating a ground-directed radar system comprising the steps of:
transmitting an initiation command to a radar pedal,
emitting a first signal from the radar pedal into an underlying layer at a first frequency in response to the initiation command,
receiving a first reflected signal from the underlying layer at the radar pedal;
transmitting first data collected from the first reflected signal to a control unit,
wherein the first data is used to examine a first penetration depth of the underlying layer;
determining, by the control unit, a potentially hazardous condition based on the first data;
transmitting an adjustment command to the radar pedal in response to the determination of the potentially hazardous condition;
emitting a second signal from the radar pedal into the underlying layer at a second frequency in response to the adjustment command,
receiving a second reflected signal from the underlying layer at the radar pedal; and
transmitting second data collected from the second reflected signal to the control unit,
wherein the second data is used to examine a second penetration depth of the underlying layer;
wherein the second penetration depth is deeper than the first penetration depth.

15. The method of claim 14, further including the step of issuing a first alert in response to determination of the potentially hazardous condition.

16. The method of claim 14, further including the steps of:
verifying, by the control unit, a potentially hazardous condition based on the second data, and
issuing a second alert in response to the verification of the potentially hazardous condition.

17. The method of claim 16, further including the step of disabling a vehicle subsystem in response to the verification of the potentially hazardous condition.

18. The method of claim 14,
wherein the adjustment command includes data corresponding to a user's selection,
wherein the data corresponding to the user's selection at least partially determines the second penetration depth.

19. The method of claim 14, further including the step of disabling a vehicle subsystem in response to the determination of the potentially hazardous condition.

* * * * *